(12) United States Patent
Markwell et al.

(10) Patent No.: US 11,559,947 B2
(45) Date of Patent: Jan. 24, 2023

(54) BUILD MATERIAL CONVEYORS

(71) Applicant: HEWLETT-PACKARD DEVELOPMENT COMPANY, L.P., Spring, TX (US)

(72) Inventors: Stan Markwell, San Diego, CA (US); Andre Garcia, San Diego, CA (US); Bernardo A Gutierrez, San Diego, CA (US); Joan Mach Beneyto, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1212 days.

(21) Appl. No.: 16/074,502

(22) PCT Filed: Mar. 30, 2017

(86) PCT No.: PCT/US2017/025047
§ 371 (c)(1),
(2) Date: Aug. 1, 2018

(87) PCT Pub. No.: WO2018/182622
PCT Pub. Date: Oct. 4, 2018

(65) Prior Publication Data
US 2021/0206084 A1 Jul. 8, 2021

(51) Int. Cl.
*B29C 64/321* (2017.01)
*B33Y 40/00* (2020.01)
*B65G 33/14* (2006.01)

(52) U.S. Cl.
CPC ............ *B29C 64/321* (2017.08); *B33Y 40/00* (2014.12); *B65G 33/14* (2013.01); *B65G 2812/0577* (2013.01)

(58) Field of Classification Search
CPC ........ B65G 33/14; B29C 64/321; B33Y 40/00
See application file for complete search history.

(56) References Cited

U.S. PATENT DOCUMENTS

| | | | | |
|---|---|---|---|---|
| 164,715 | A * | 6/1875 | Caldwell | B65G 33/00 198/670 |
| 261,714 | A * | 7/1882 | Hope | B65G 33/00 198/670 |
| 2,173,414 | A | 9/1939 | Fulton | |
| 2,364,353 | A * | 12/1944 | Escher | B65G 33/14 198/608 |
| 3,278,987 | A | 10/1966 | Wolf | |
| 4,944,382 | A | 7/1990 | Gradoboev et al. | |
| 5,657,852 | A * | 8/1997 | Bavington | B65G 33/24 198/496 |

(Continued)

FOREIGN PATENT DOCUMENTS

| | | |
|---|---|---|
| CN | 205086160 U | 3/2016 |
| DE | 218034 A1 | 1/1985 |

(Continued)

*Primary Examiner* — William R Harp
(74) *Attorney, Agent, or Firm* — Shook, Hardy & Bacon L.LP.

(57) ABSTRACT

A build material conveyor is disclosed. Such conveyor comprising an auger to transport build material in a substantially vertical direction wherein the conveyor further comprises a set of wall elements selectively positioned to, in a first position occupy part of the volume of the auger.

19 Claims, 10 Drawing Sheets

(56) References Cited

U.S. PATENT DOCUMENTS

| | | |
|---|---|---|
| 7,314,131 B2 | 1/2008 | Olds |
| 8,909,105 B2 | 12/2014 | Koakutsu |
| 2008/0241404 A1 | 10/2008 | Allaman et al. |
| 2016/0096321 A1 | 4/2016 | Fry et al. |
| 2016/0325939 A1 | 11/2016 | Walton et al. |
| 2017/0072463 A1 | 3/2017 | Ng et al. |

FOREIGN PATENT DOCUMENTS

| | | | |
|---|---|---|---|
| DE | 3642870 C1 | * | 1/1988 |
| JP | 63123714 A | * | 5/1988 |
| JP | H-04101915 A | | 4/1992 |
| JP | 407251912 A | | 10/1995 |
| JP | 2001288774 A | | 10/2001 |
| SU | 384759 A1 | | 4/1973 |
| WO | 2015196237 A1 | | 12/2015 |
| WO | 2016044837 A1 | | 3/2016 |
| WO | 2017048865 A1 | | 3/2017 |
| WO | WO-2017038984 A1 | | 3/2017 |

* cited by examiner

BUILD MATERIAL CONVEYORS

BACKGROUND

Many additive manufacture systems, commonly known as three-dimensional (3D) printers, enable objects to be generated on a layer-by-layer basis. Powder-based 3D printing systems, for example, form successive layers of a build material in a printer and selectively solidify portions of the build material to form layers of the object or objects being generated.

Before being sent to the printer for processing, build material can be stored in a container known as build unit and is transferred to the printer through a build material conveyor.

Build material is often either powdered or particulate type material or liquid material, at least, while it is stored in the build unit.

BRIEF DESCRIPTION

Examples will now be described, by way of non-limiting example only, with reference to the accompanying drawings.

DETAILED DESCRIPTION

Powder or liquid based 3D printing systems generate objects by forming successive layers of build material on a movable support platform. Portions of each layer are selectively solidified using any suitable technique, and a support platform may be lowered into a build chamber (also known as a build volume) to enable the next layer of build material to be formed. Suitable selective solidification systems include, for example, laser sintering systems, chemical binder systems, and fusing agent and fusing energy systems.

In such 3D printing systems, the time it takes to generate an object or objects may be, to a certain extent, dependent on the speed to convey material from the build unit to the printer. Also, it may be desirable that the flow rate of material being fed to the printer is as high and repeatable as possible.

Figure 1:
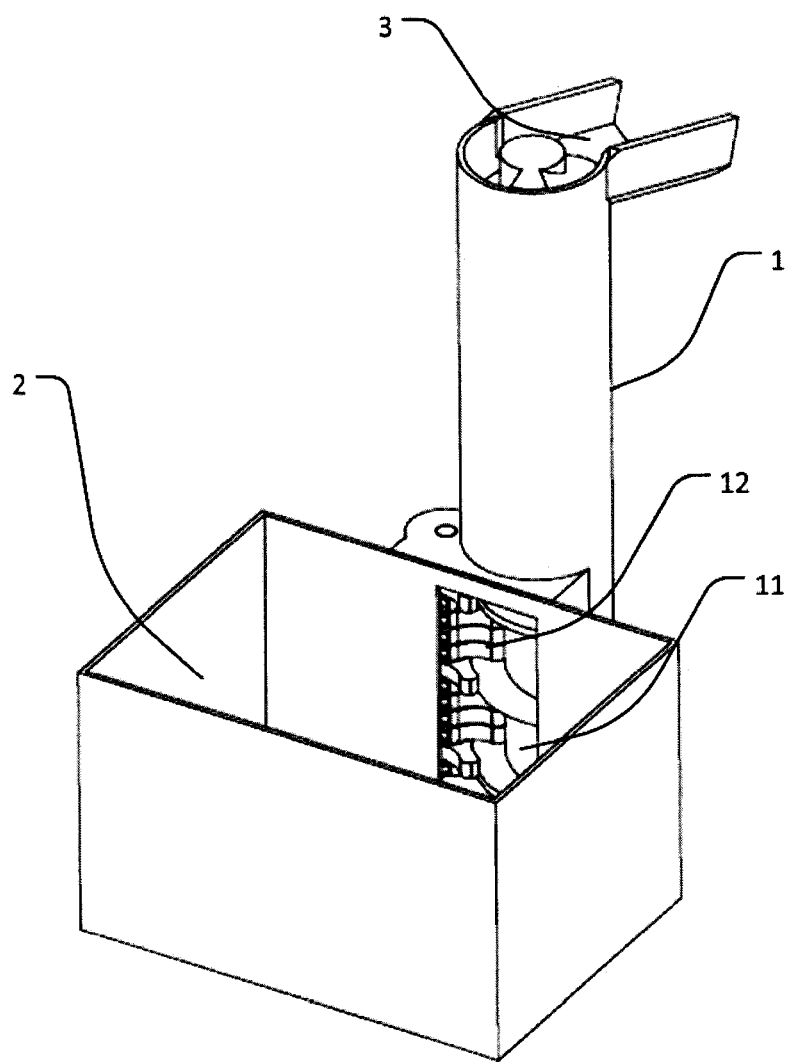
FIG. 1 is a an example of conveyor to transport build material.

FIG. 1 shows an example of build material conveyor 1 to transport build material from a storage container 2 to an outlet 3 that can be connected to another module within, e.g., a 3D printer, such as a build unit or a printing module. FIG. 1 shows an ex-ample wherein the conveyor comprises a helicoidal element 11 such as an auger wherein, as this element rotates in a defined direction, build material is transported following the travel path of the crests. Also, FIG. 1 shows an example wherein the conveyor further comprises a set of wall elements 12 located as to selectively cover parts of the conveyor as will be explained in more detail below.

Figure 2:
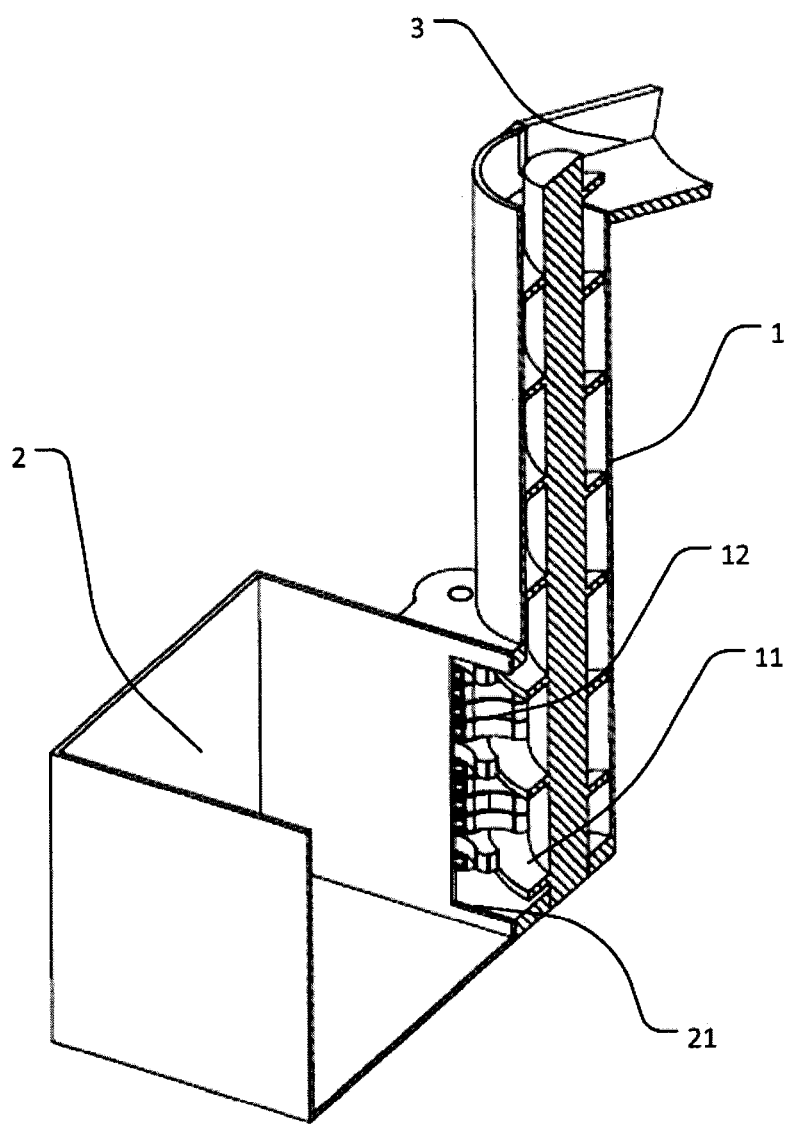
FIG. 2 is a longitudinal section of the example of FIG. 1.

FIG. 2 shows a longitudinal section wherein the helicoidal element 11 can be seen in more detail as can the interaction with the wall elements 12. Also, it can be seen that build material passes from the storage container 2 to the conveyor 1 through an inlet 21 that, in this case, is an opening that communicates with the storage container 2 and the conveyor 1. Also, with reference to FIG. 2 it can be seen that the helicoidal element is substantially vertical, the conveyor may work with a tilt of around 20 degrees from the vertical or around 10 degrees and even with no tilt, as in the example shown in FIG. 2.

Figure 3:
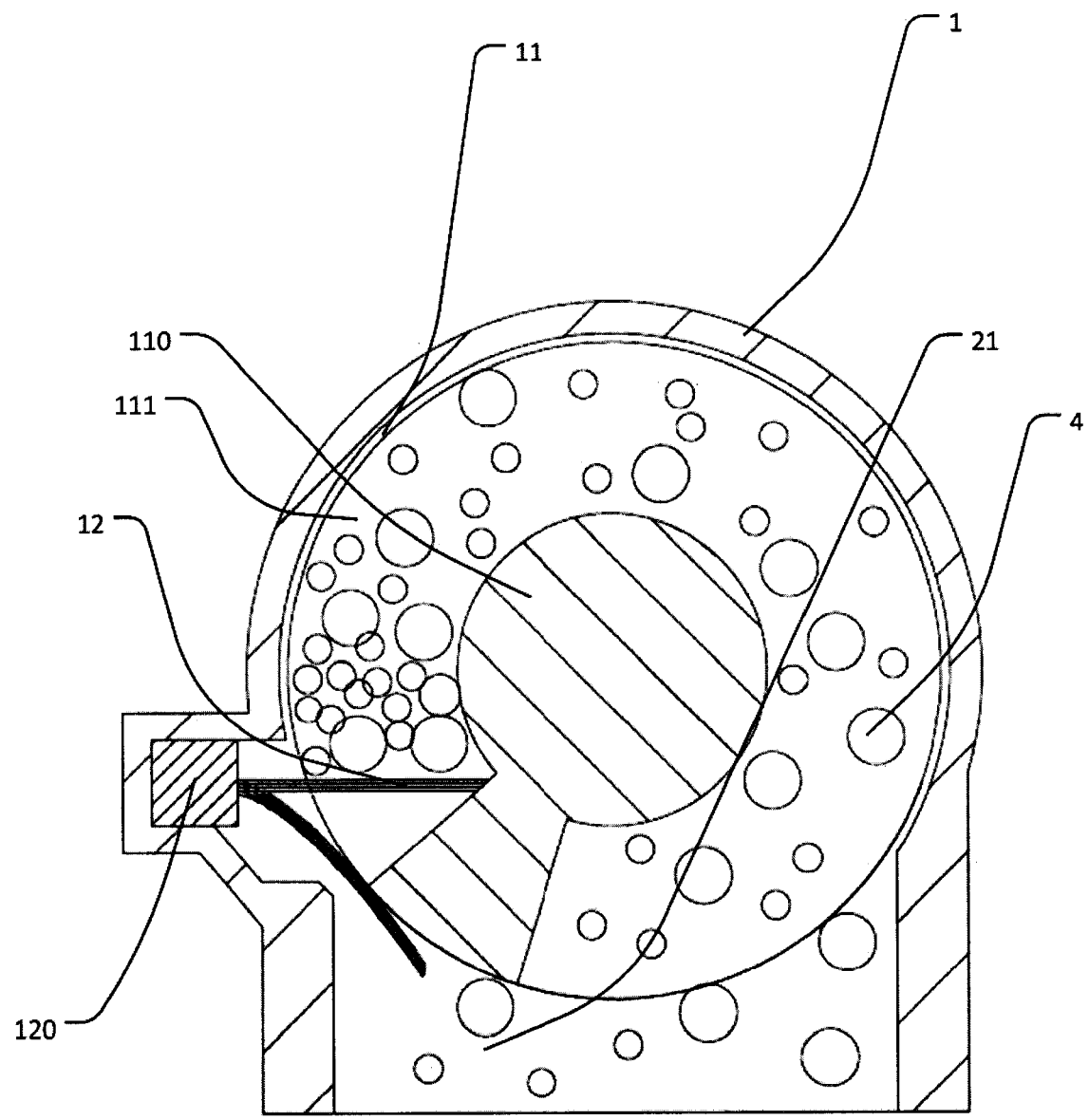
FIG. 3 is a transverse section view from the top of an example of conveyor.

FIG. 3 shows an example that illustrates the transportation process of build material within the conveyor. As the helicoidal element is rotated build material 4 passes from a build material storage container 2 through the inlet 21, and reaches the upper surface of the helicoidal element 1 wherein the rotational movement of this helicoidal element 1 transports the material following a spiral movement until it reaches a wall element 12, the wall element 12 eliminates the rotational component of such spiral movement so that material is moved mostly upwards. Additionally, the wall element 12 stacks the build material 4 thereby increasing the flow build material that reaches the output and making the flow more repetitive, i.e., the amount of build material that reaches the output is substantially more constant that in the case wherein no wall element 12 is put in place. In the case of free flowing powder type materials travelling in an upward travel direction the wall element prevent build material 4 from flowing or falling back to the storage container 2 or the inlet 21.

In the example of FIG. 3, the wall element 12 is an elastic element which is pivotally attached to an auxiliary structure 120, the elastic element being biased in a direction opposite to the rotation direction of the helicoidal element 11.

Figure 4:
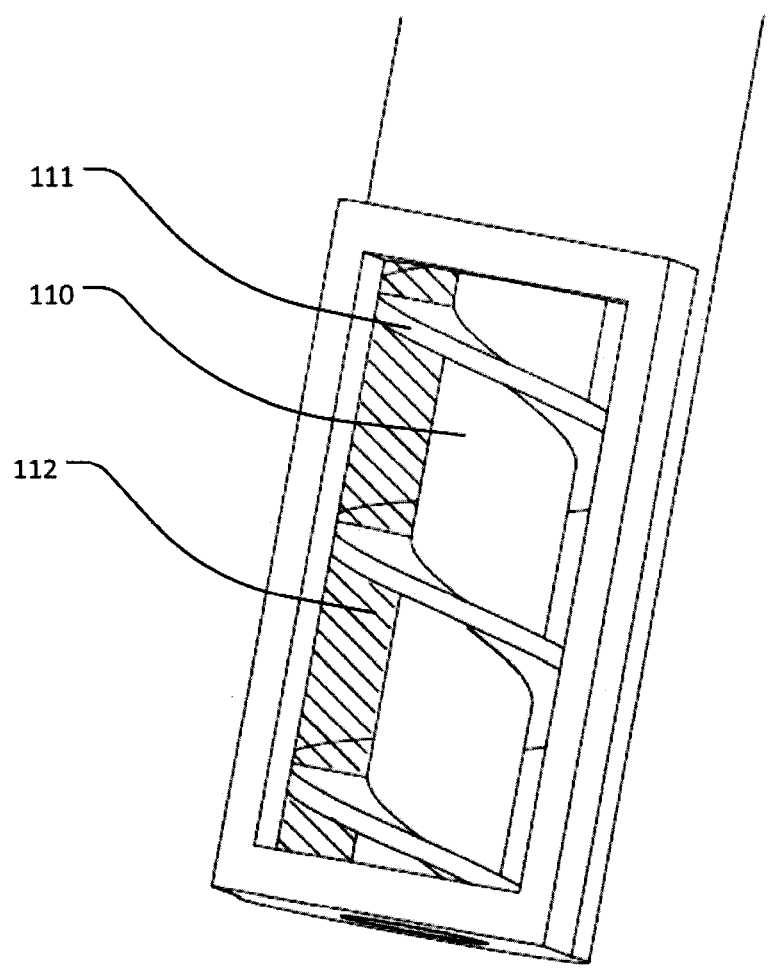
FIG. 4 is a view of detail of a helicoidal element for a conveyor.

FIG. 4 shows the helicoidal element 11 in more detail. In this figure, it can be seen that the helicoidal element comprises a shaft 110 and crests 111. As mentioned above, transportation of build material is made by the upper surface of the crest. Consequently, the larger the area of the crest (or, in other words, the transversal length of the helicoidal element), the more material that can be transported. By locating a wall element between at least one pair of crests 111 the stacking of material increases the volume of material that can be transported on each full rotation of the helicoidal element, in essence, the effective area 112 of the helicoidal element 11 that can be used for transportation is defined by the transversal length of the helicoidal element 11, the width of the shaft 110 and the distance between crests, i.e., the effective area 112 of the helicoidal element 11 is the area between each pair of adjacent crests 111 of the helicoidal element and transversely between the edge of the adjacent crests 111 and the shaft 110.

In an example, the wall elements are located between at least one pair of crests, nonetheless, such wall elements can be located between some or even all pairs of crests.

Figure 5:
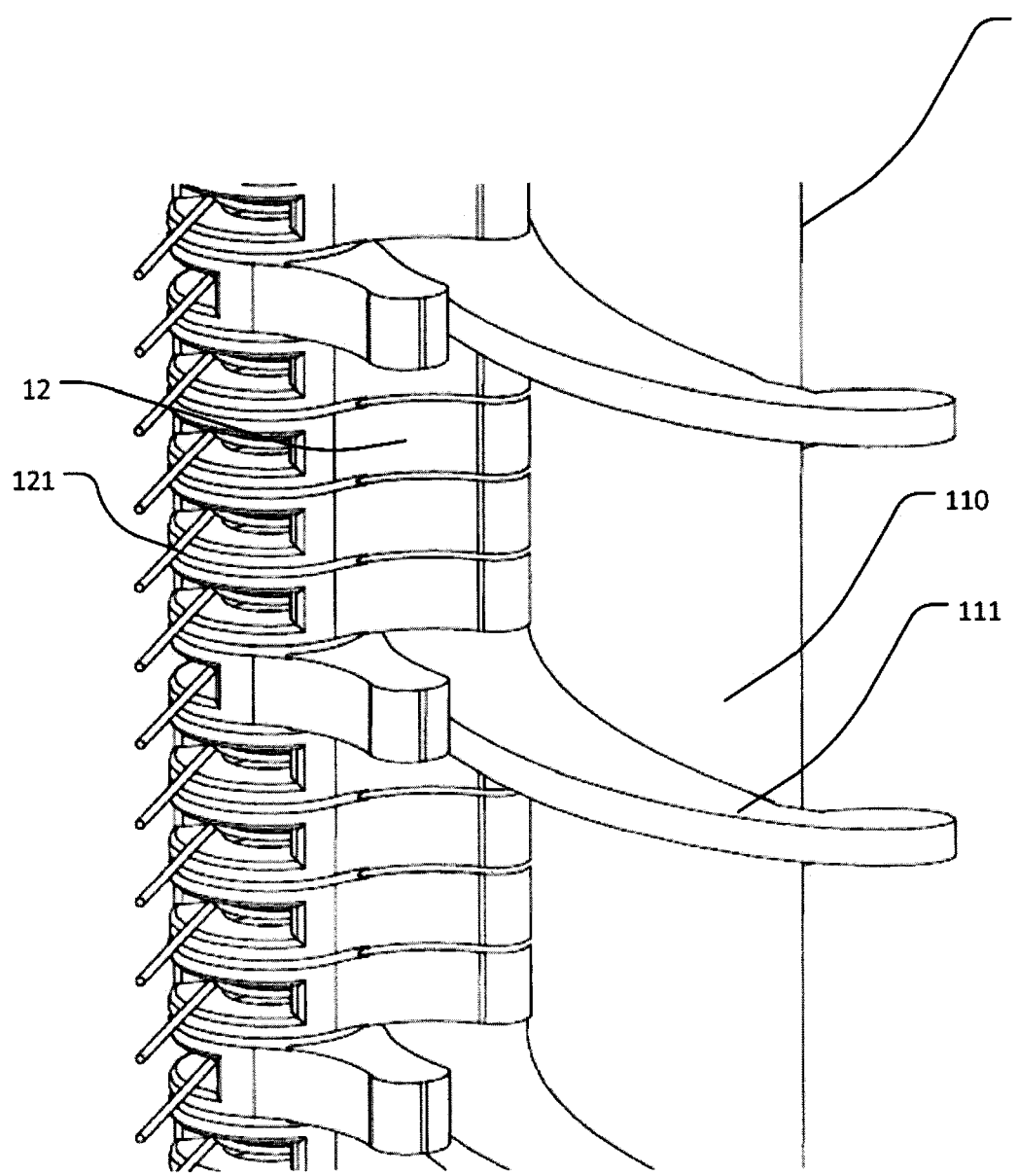
FIG. 5 is an example of conveyor with fingers as wall elements.

FIG. 5 shows an example of wall element 12. In this example the wall elements 12 are a set of fingers which are biased to the effective area by means of elastic or spring-compliant members 121. In a particular example, the elastic members 121 can be replaced by a spring or even be replaced by electrically activated members such as solenoids. In this example, a clockwise rotation of the helicoidal element 11 moves some fingers in a clockwise direction thereby moving them outside the effective area so that the crests are allowed to move as the helicoidal element is rotated. The elements that are in the effective area work as stops preventing the material from moving in directions other than the conveying direction, in the case wherein the conveyor is used for vertical transport (such as in FIGS. 1 and 2) the conveying direction would be a substantially upwards direction.

Figure 6:
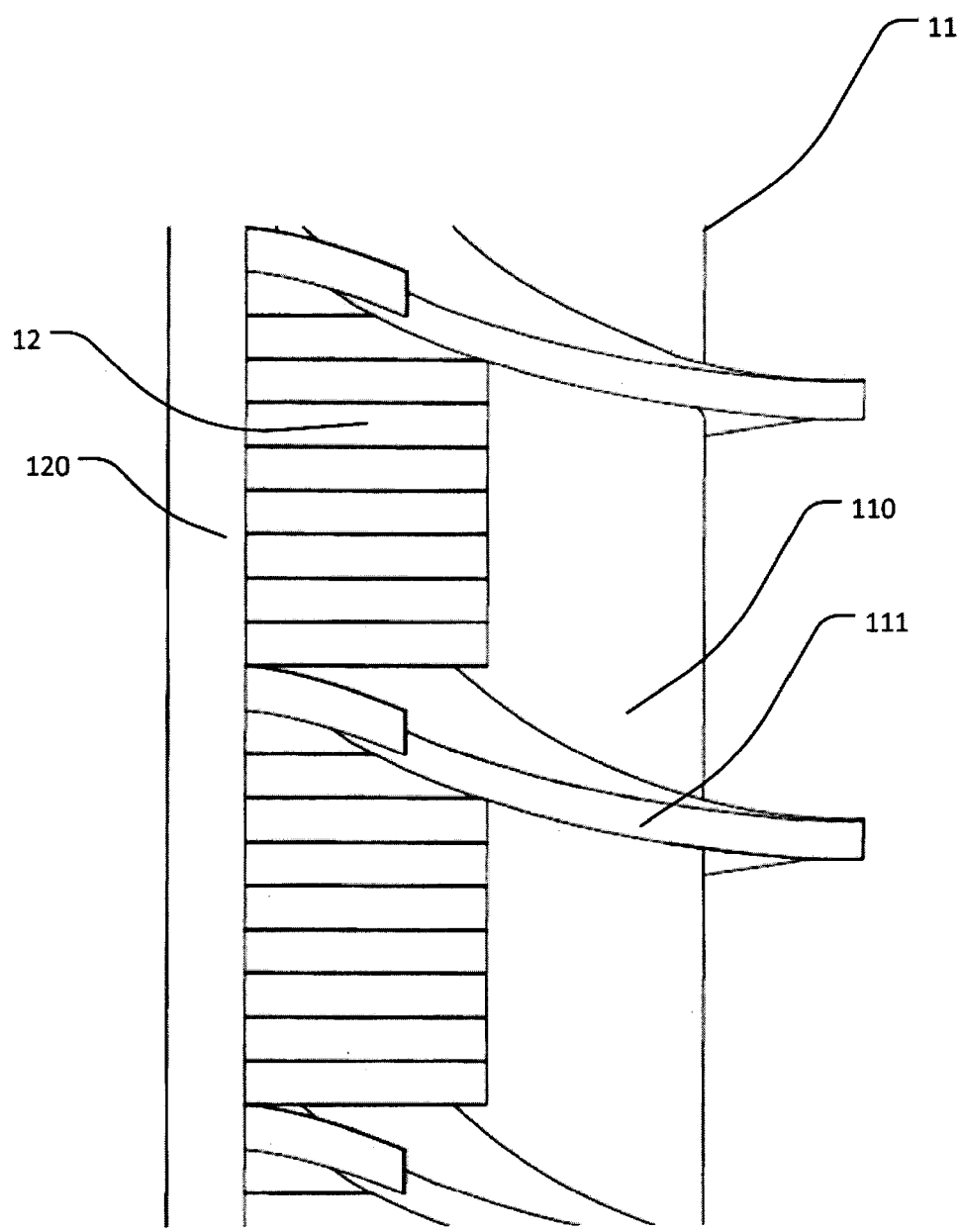
FIG. 6 is an example of conveyor with elastic strips as wall elements.
Figure 7:
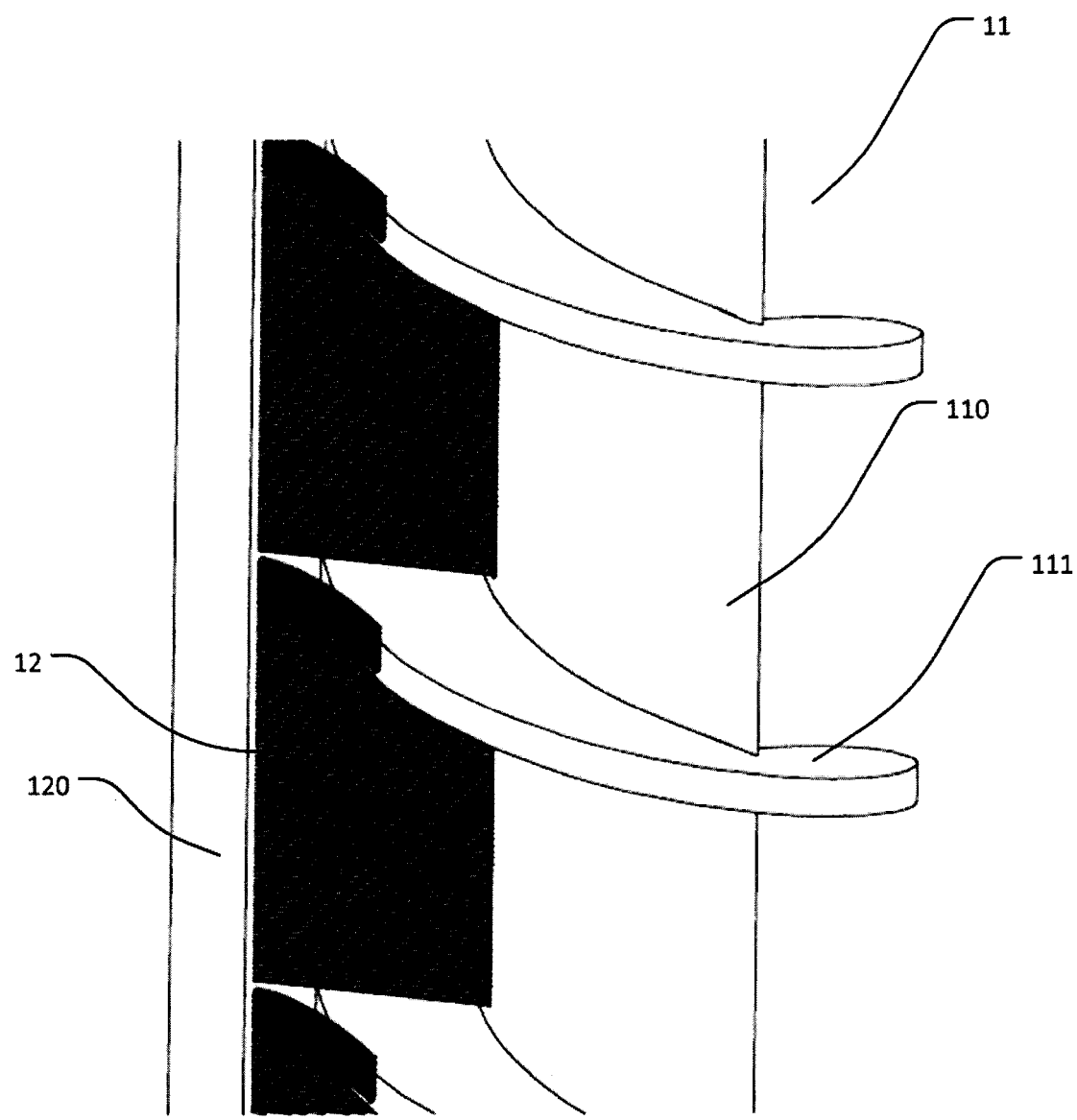
FIG. 7 is an example of conveyor with bristles as wall elements.

FIGS. 6 and 7 show two further examples of wall elements wherein the wall elements can be, e.g., elastic elements such as flexible elements or elements pivotably attached to an auxiliary structure 120. In the case of FIG. 6 the elastic elements are flexible strips and in the case of FIG. 7 bristles can also be used as wall elements 12. Such strips or bristles can be made of any flexible material, e.g., plastics or thin metal.

In this example, the elastic elements are attached to the auxiliary structure so that they protrude from such auxiliary structure in a substantially perpendicular direction. As the helicoidal element 11 rotates in order to convey build material, the crests of the helicoidal element push on some of the elastic elements in the rotating direction of such helicoidal element, the elastic elements are attached to the auxiliary structure in such way that they are biased in the opposite rotation direction so that they allow the crests to pass but once the crests has passed the elastic elements are biased to return to their original position thereby returning to a position occupying at least part of the effective area.

Figure 8:
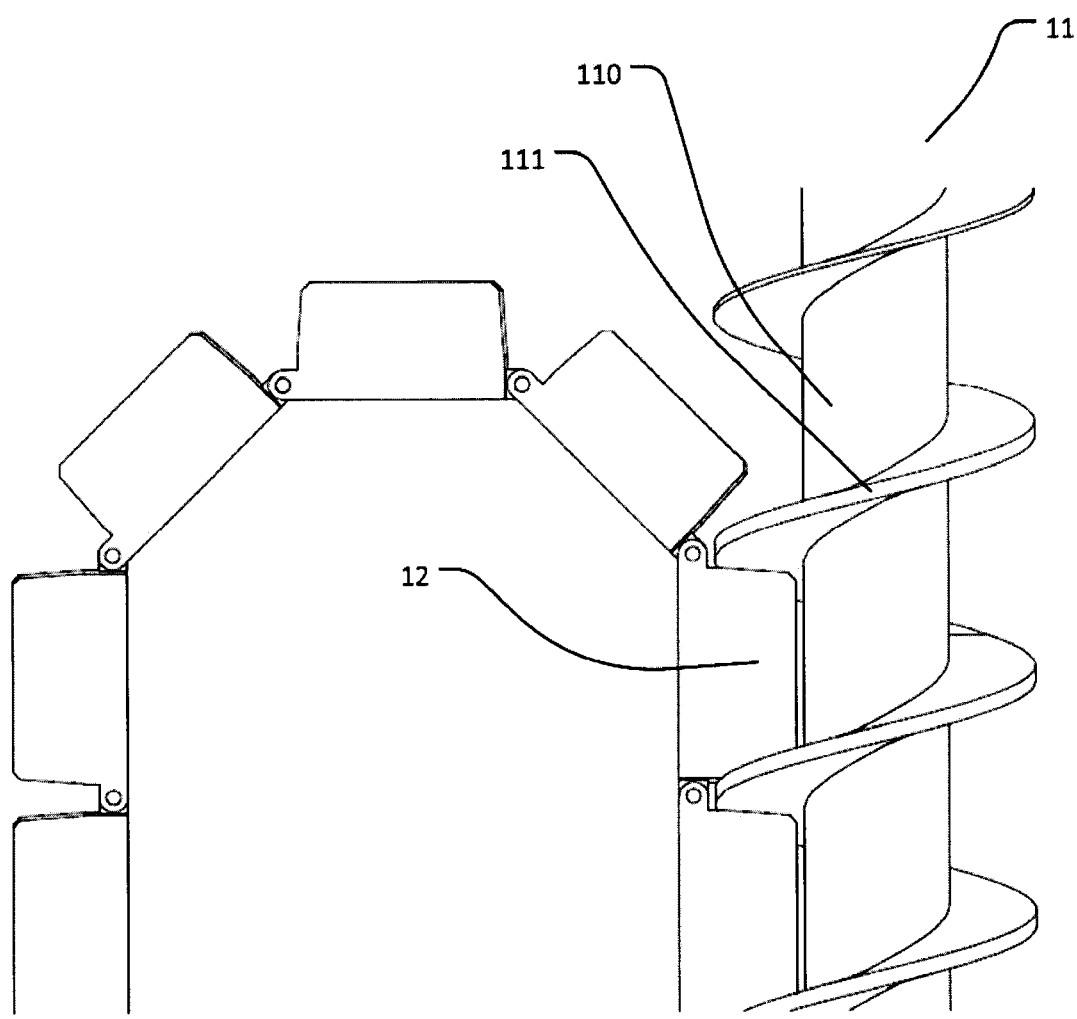
FIG. 8 is an example of conveyor with longitudinally movable paddles as wall elements.

FIG. 8 shows an example wherein the wall elements 12 are a set of paddles configured to move longitudinally along the helicoidal element 11 in the travel direction of the build material, wherein a paddle is provided between at least some pairs of crests 111. The paddles may be rotatably attached together by means of joints.

This example may be configured so that the rotation of the helicoidal element 11 causes a movement of the wall elements in the conveying direction, for example, upwards. The paddles may be arranged in a guiding mechanism or be attached to a rotating mechanism around an axis substantially orthogonal to the shaft.

In this example the rotating mechanism causes less wear on the helicoidal element given that there is no or little friction between the wall elements 12 and the crests 111. Furthermore, the movement of the paddles can also be performed by motor means so that the helicoidal element does not have to act on the wall elements 12 thereby further reducing its wear.

Figure 9:
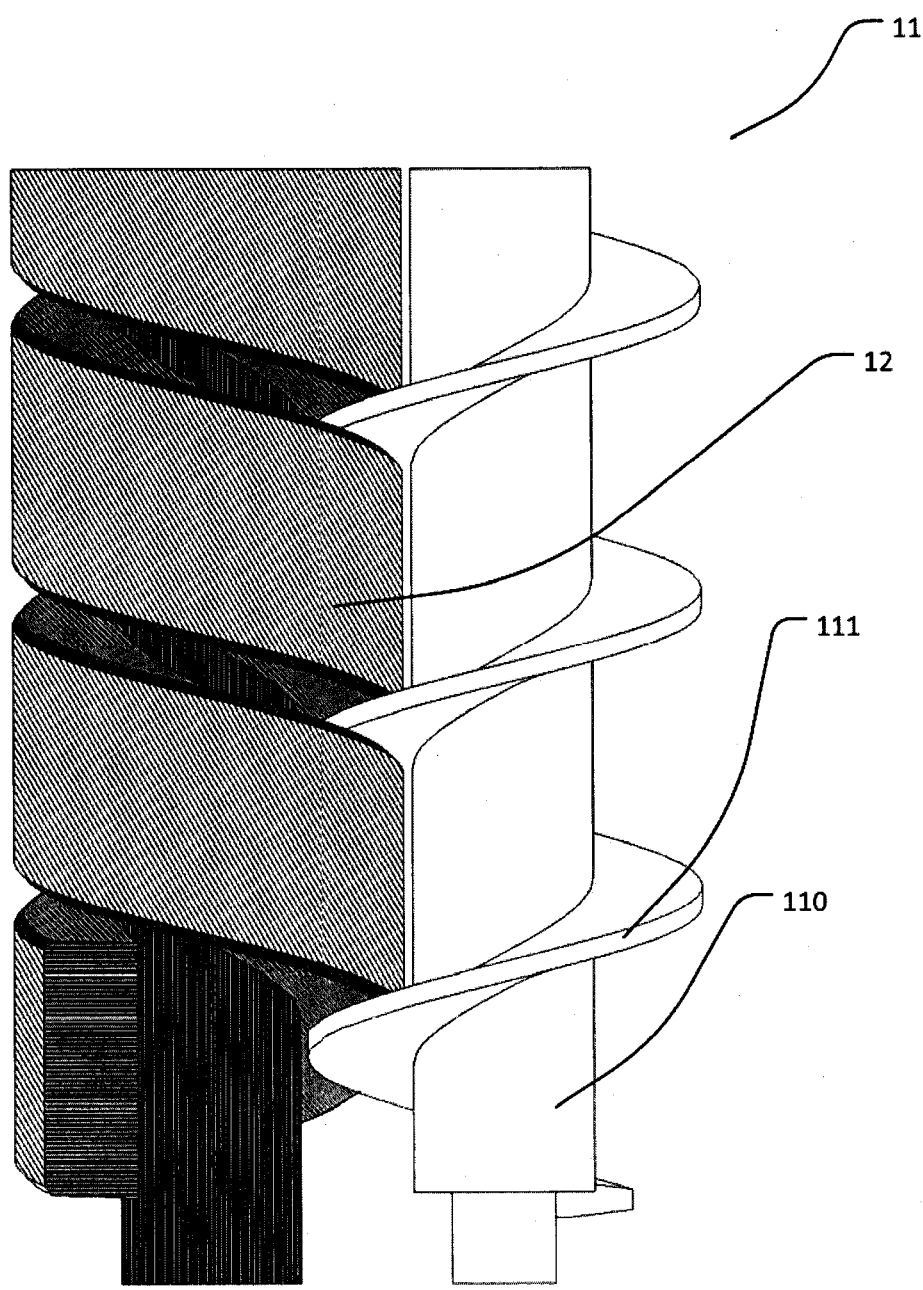
FIG. 9 is a an example of conveyor with a complementary element as wall element.

FIG. 9 shows an example wherein the wall element 12 can be a complementary helicoidal element rotating in a direction opposite to the helicoidal element 11 the complementary helicoidal element 11 may be dimensioned so that each of its crests has approximately the width of the effective area, i.e., the pitch of the helicoidal element 11. This width can be of around 90% or 80% the effective width to avoid wear of the elements.

The complementary helicoidal element can also be seen as a slotted cylinder wherein the slots are configured so that the crests of the helicoidal element go through such slots. The complimentary element may rotate in a direction opposite to the rotating direction of the helicoidal element 11.

Figure 10:
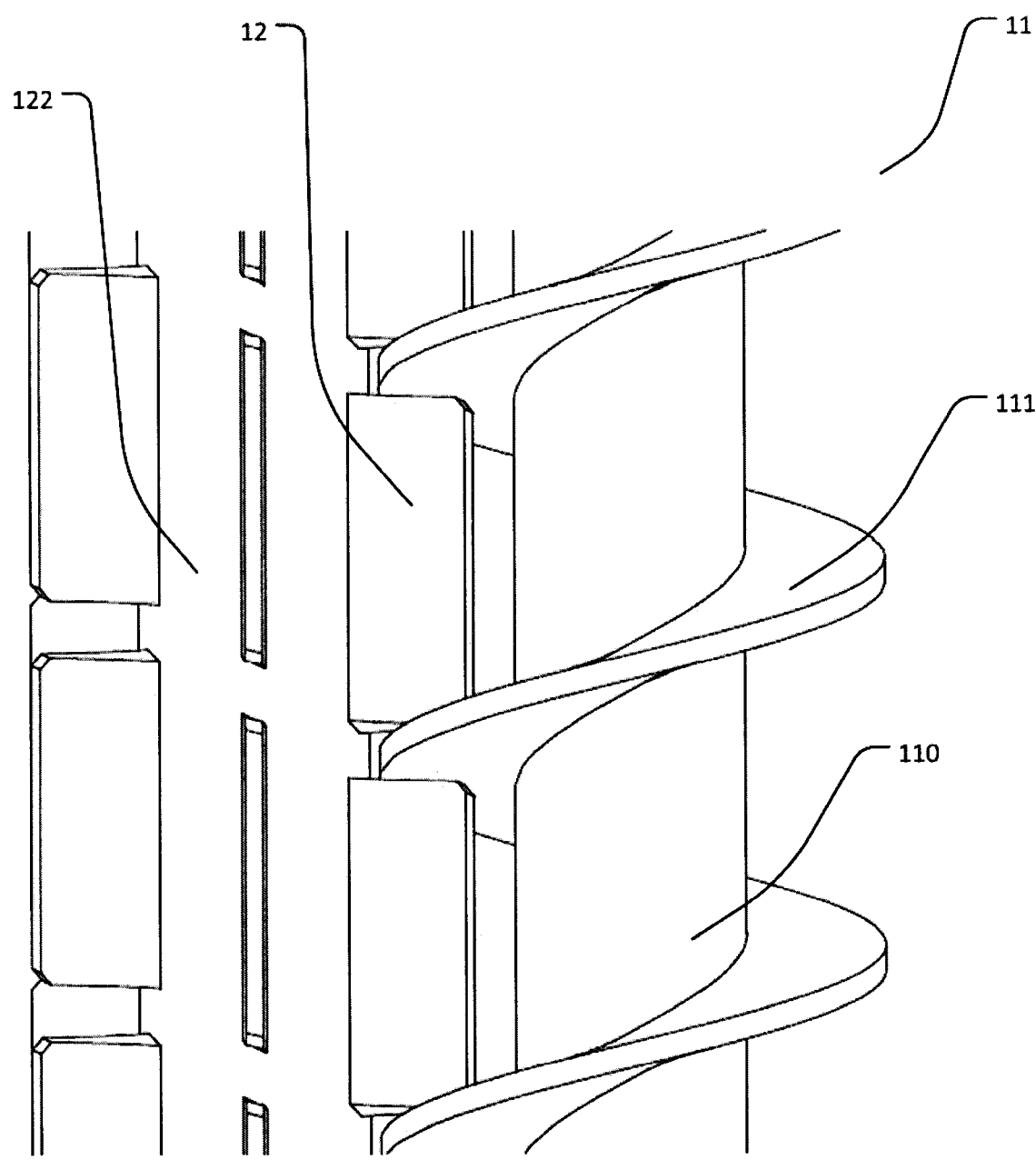
FIG. 10 is a an example of conveyor with rotating paddles as wall elements.

Another example that could have a similar functionality to that of the complementary helicoidal element is shown in FIG. 10 wherein the wall elements 12 are a set of rotating paddles. Such paddles are attached to an auxiliary structure 122 that work as an axis for their rotation, the paddles can also be made of elastic material to have a sweeping effect on the upper surface of the crests.

Several examples of wall elements 12 have been shown above, however, the wall elements can be any element configured to move from a position wherein they cover less of the effective area (or even outside the effective area) of a helicoidal element to a position wherein they function as active wall elements and occupy more of the effective area thereby achieving a stacking function on the build material 4.

In essence, the examples show a build material conveyor comprising: an inlet defining a passage between a build material container and the conveyor; an outlet located remote from the inlet, and a helicoidal element between the inlet and the outlet, the helicoidal element surrounding a central axis defined by its shaft; wherein the build material conveyor transports build material using at least part of an effective area of the helicoidal element defined as the area between each pair of adjacent crests of the helicoidal element and transversely between the edge of the adjacent crests and the central axis and wherein the build material conveyor further comprises a set of wall elements configured to selectively cover, at least partially the effective area of the helicoidal element.

Furthermore, it is disclosed that the wall elements may be movable between a first position, wherein the walls are located as to at least partially cover the effective area, and a second position wherein the wall elements are located outside the effective area.

In an example, the wall elements comprise an elastic mechanism to move the elements between the first and the second position. In this case, the wall elements may be elastic elements, such as, a set of fingers rotatably attached to an auxiliary structure and biased towards the effective area, a set of flexible strips, and/or a set of flexible bristles. In any case, the wall elements may be biased to cover the effective area and moved to a second position outside the effective area by means of the crests of the helicoidal element.

In the case of elastic elements, they may be attached to an auxiliary structure and biased to cover the effective area.

In another example, it is disclosed an auger to transport build material in a substantially vertical direction wherein the conveyor further comprises a set of wall elements selectively positioned to, in a first position occupy part of the volume of the auger. The transportation can be completely vertical or tilted around 20 degrees. The wall elements of this example may be selectively positioned to occupy the volume of the auger in a plane parallel to the helicoidal element's axis.

The wall elements are movable from the first position wherein the elements occupy, at least partially the volume of the auger and a second position wherein the wall elements are outside the volume of the auger.

One use of the conveyor can be in a 3D printing system comprising a storage module and another module, the 3D printing system comprising a build material conveyor to transport material from the storage module to the another module comprising:

an inlet defining a passage between a build material container and the conveyor;

an outlet located remote from the inlet, and a helicoidal element between the inlet and the outlet, the helicoidal element surrounding a central axis;

wherein the build material conveyor transports build material using an effective area of the helicoidal element defined as the area between each pair of adjacent crests of the helicoidal surface and transversely between the edge of the adjacent crests and the central axis and wherein the build material conveyor further comprises a set of wall elements configured to selectively cover, at least partially the effective area of the helicoidal element.

Furthermore a method is discussed for conveying build material from a build material container to another 3D printing module by using a conveyor comprising a helicoidal element, the method comprising:

rotating the helicoidal element so that the helicoidal element transports build material using an effective area of the helicoidal element, the effective area being defined as the area between each pair of adjacent crests of the helicoidal surface and transversely between the edge of the adjacent crests and the central axis; and selectively setting a set of wall elements to cover, at least partially the effective area of the helicoidal element.

The wall elements may be set to cover the effective area in a plane parallel to the helicoidal element's axis. Also, the wall elements may be movable from a first position wherein the elements cover, at least partially the effective area of the helicoidal element and a second position wherein the wall elements are outside the effective area of the helicoidal element.

The invention claimed is:

1. Build material conveyor comprising:
an inlet defining a passage from a build material container into the conveyor;
an outlet located remote from the inlet, and
a helicoidal element arranged vertically between the inlet and the outlet, the helicoidal element surrounding a central axis;
wherein the build material conveyor transports build material vertically upward using at least part of an effective area of the helicoidal element defined as the area between each pair of adjacent crests of the helicoidal element and transversely between the edge of the adjacent crests and the central axis and
wherein the build material conveyor further comprises a set of wall elements configured to selectively cover, at least partially the effective area of the helicoidal element, the wall elements biased to extend laterally into the area between adjacent crests of the helicoidal element but moveable in a horizontal plane to accommodate rotation of the helicoidal element.

2. Build material conveyor according to claim 1, wherein the wall elements are movable between a first position, wherein the wall elements are located so as to at least partially cover the effective area, and a second position wherein the wall elements are located outside the effective area.

3. Build material conveyor according to claim 2, wherein the wall elements comprise an elastic mechanism to move the elements between the first and the second position.

4. Build material conveyor according to claim 3, wherein the wall elements are a set of fingers.

5. Build material conveyor according to claim 4, wherein the fingers are biased by the elastic mechanism to cover the effective area.

6. Build material conveyor according to claim 5, wherein the fingers are moved from the first position to the second position by the crests of the helicoidal element.

7. Build material conveyor according to claim 1, wherein the wall elements are elastic elements.

8. Build material conveyor according to claim 7, wherein the elastic elements are a set of flexible strips.

9. Build material conveyor according to claim 7, wherein the elastic elements are a set of flexible bristles.

10. Build material conveyor according to claim 7, wherein the elastic elements are attached to an auxiliary structure and biased to cover the effective area.

11. Build material conveyor according to claim 10, wherein the elastic elements are moved from the position covering the effective area to a position outside the effective area by the crests of the helicoidal element.

12. Build material conveyor according to claim 1, wherein the wall elements are deflected from a biased position by interaction with the rotating helicoidal element.

13. Build material conveyor according to claim 1, wherein the wall elements are moveable in the horizontal plane by an actuator.

14. Build material conveyor according to claim 13, wherein the actuator comprises a solenoid.

15. Build material conveyor according to claim 1, wherein the wall elements comprise bristles extending laterally into the area between adjacent crests of the helicoidal element.

16. Build material conveyor comprising an auger to transport build material in a substantially vertical direction wherein the conveyor further comprises a set of wall elements selectively positioned to, in a first position occupy part of the volume of the auger, the wall elements comprising flexible bristles extending into an area between turns of the auger, wherein the wall elements are movable from the first position wherein the elements occupy, at least partially the volume of the auger and a second position wherein the wall elements are outside the volume of the auger.

17. Build material conveyor according to claim 16, wherein the wall elements deflect to accommodate rotation of the auger.

18. 3D printing system comprising a storage module and a build material conveyor to transport material from the storage module, the system further comprising:
an inlet defining a passage between the storage module and the conveyor;
an outlet located remote from the inlet, and
a helicoidal element arranged vertically between the inlet and the outlet, the helicoidal element surrounding a central axis;
wherein the build material conveyor transports build material vertically upward using an effective area of the helicoidal element defined as the area between each pair of adjacent crests of the helicoidal element and transversely between the edge of the adjacent crests and the central axis and
wherein the build material conveyor further comprises a set of wall elements configured to selectively cover, at least partially the effective area of the helicoidal element, the wall elements biased to extend laterally into the area between adjacent crests of the helicoidal element but moveable in a horizontal plane as deflected by rotation of the helicoidal element.

19. 3D printing system according to claim 18, wherein the wall elements comprise bristles extending laterally into the area between adjacent crests of the helicoidal element.

* * * * *